Patented Oct. 8, 1940

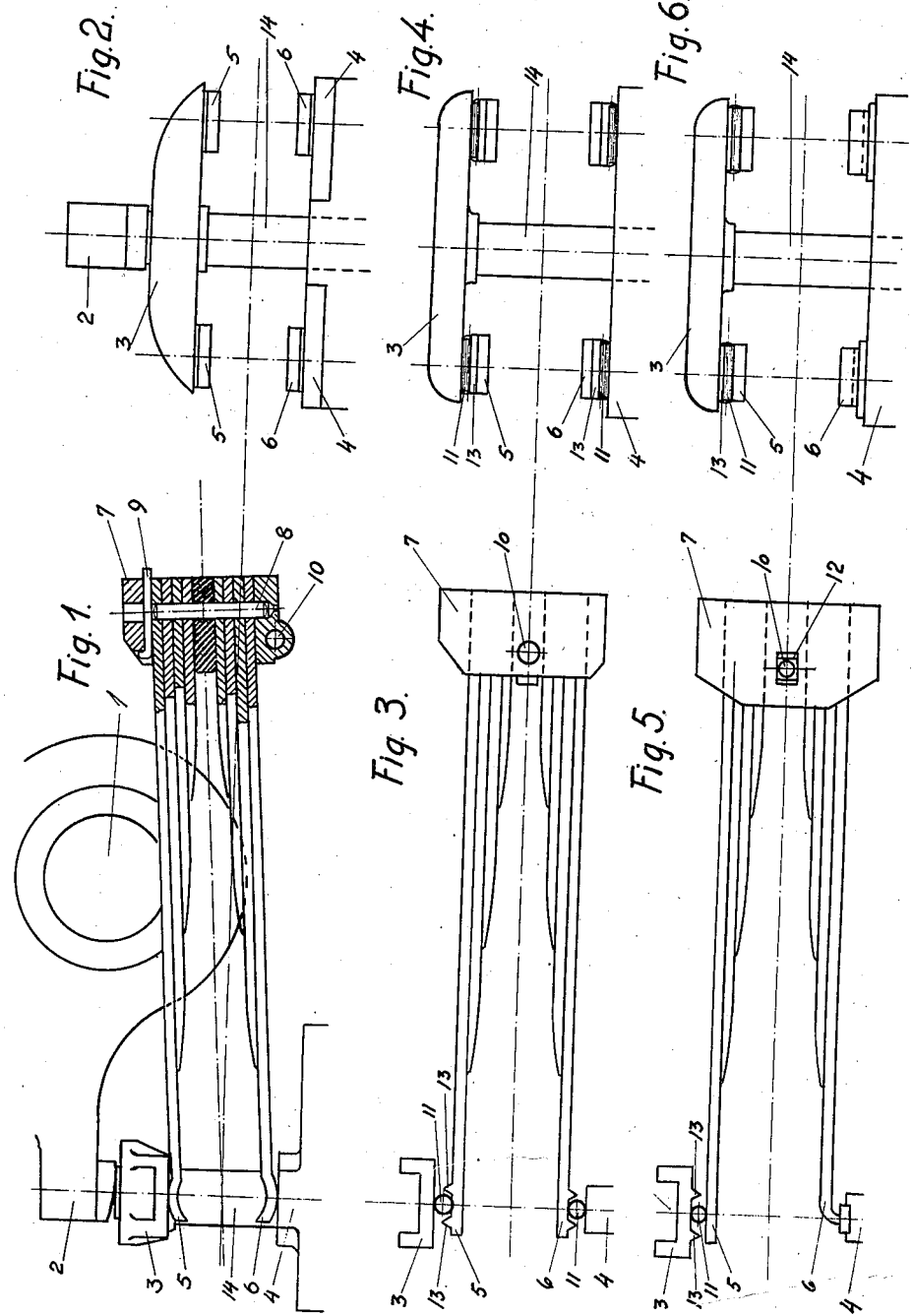

2,217,549

UNITED STATES PATENT OFFICE 2,217,549

VALVE SPRING FOR ENGINES

Torkild Valdemar Hemmingsen, Copenhagen, Denmark

Application September 7, 1938, Serial No. 228,866
In Denmark September 17, 1937

4 Claims. (Cl. 123—188)

The invention relates to a valve spring for engine valves controlled by means of cam disks, cams or similar control organs such as, for instance, exhaust valves on Diesel engines or other internal combustion engines, and valves fitted with such valve springs.

In connection with such valves whose travel in the one direction is caused by a cam disk or cam or like means and in the other direction by a spring there appears a certain tendency towards the creation of natural vibrations in the spring in that the impulses derived from the cam disk may resound with the natural vibration frequency of the valve spring in respect of oscillation in the axial direction of the spring.

The invention has for its object the elimination of this inconvenience through the replacement of the volute (helical) springs as hitherto used by laminated springs of special design which makes it possible to obtain a natural spring vibration frequency which is of such magnitude as to exceed that of the influences resulting from the periodic impulses of the cam disk.

The valve spring used in accordance with the invention is mainly characterised in that it possesses the general shape of a hairpin- or U-shaped laminated spring which is arranged or suspended pivotally, preferably about an axis situated in or in the vicinity of its closed end, the two open branches of the spring contacting each with one of the two surfaces between which the spring is to function, or with the valve itself and with a fixed body.

It should be noted that even though a design embodying a laminated spring fixed at one end by clamping is known, such construction would be inapplicable in connection with larger machines, since it would in practice be impossible to keep such springs within reasonable proportions if they were to combine sufficient spring power with adequate flexibility. This however, is feasible with a hairpin shaped pivotally suspended spring according to the invention.

It may be conceived that the spring shaped in the form of a hairpin might be replaced by a spring shaped like a "double hairpin," or a spring of elliptical or similar shape such as an ordinary carriage spring, but when the top part of a spring of this kind moves with the opening and closing of the valve, the bottom part remaining stationary, then the spring masses in the top part (concentrating in the vicinity of the centre) will be subject to full movement corresponding with the valve travel and thus be influenced powerfully by the impulses from the latter. In other words, a spring of this kind will have a low natural vibration frequency and the conditions favouring a resonant effect will be present in a manner similar to that found in connection with the volute spring constructions in general use. This drawback is just what the valve springs according to this invention eliminate because these springs have the spring masses located mainly at the closed end of the spring so that their movement upwards and downwards is very restricted when the turning axis of the spring is located in or in the vicinity of the closed end, thus contributing in a very limited degree only towards the reduction of the natural vibration frequency.

The utilization of a laminated spring according to the invention has the additional advantage that the engine may be built with a somewhat lower overall height which is a feature of special importance in connection with engines used for propelling ships.

For an ordinary valve it is possible to use, for instance two laminated springs arranged one on each side of the valve spindle or valve lever, but one spring may also be sufficient, arranged, for instance, on the side of the valve spindle opposite to the valve lever and provide, if desired, in its free end with a slot for the lever. The spring may also be arranged on the same side of the valve spindle as the valve lever which may for this purpose be of bifurcated design.

Further forms of execution of the invention are apparent from the following specification and the claims.

The invention is illustrated in the accompanying drawing, wherein:

Fig. 1 is a view in side elevation and part showing a form of execution of a valve spring according to the invention together with adjacent valve gear parts.

Fig. 2 is an end elevational view of parts shown in Fig. 1.

Figs. 3 and 4 are similar views illustrating a modification, and

Figs. 5 and 6 illustrate a third form of execution.

Fig. 1 shows a valve control lever 2 turning on a shaft or journal 1, the free end of the valve control lever 2 actuating a movable spring guide 3 on a valve spindle 14. The corresponding fixed spring guide is marked 4. The free ends 5 and 6 of a hairpin shaped laminated spring are arranged between the spring guides 3 and 4, the spring being composed in a known manner of a number of spring laminations of decreasing lengths, which at the closed end of the spring are clamped into a casing 7 by means of a pin 8 and a wedge 9. The spring casing 7 is fitted with a journal 10 upon which the spring is suspended, so as to be capable of turning round an axis parallel with the shaft 1. The journal 10 is adjacent one face but below the spring. The spring ends 5 and 6 are made with curved surfaces, preferably in such a manner that the spring parts in question may, when the spring functions, roll against the surfaces of the spring guides 3 and 4 with which they are in contact. In the form of execution shown the surfaces are plane and the spring ends 5 and 6 arcuate shaped.

As seen from Fig. 2, two hairpin shaped laminated springs are arranged, one on each side of the valve lever, and the springs may be connected by means of a cross member not shown.

In the form of execution shown on Figs. 3 and 4 the turning axis 10 of the spring is located within the spring instead of below the same. The ends of the laminated spring are here plane, rollers 11 being arranged between the ends and the corresponding contact surfaces of the spring guides 3 and 4.

Figs. 5 and 6 show a somewhat modified execution in that the lower end 6 of the laminated spring is bent, and inserted in a corresponding groove in the spring guide 4. Further, the laminated spring is here suspended at 10 in such a manner, that it may turn and be displaced in its lengthwise direction within certain limits such as permitted by the slot 12.

The rollers 11 may be kept in place by means of suitable stops or projections as indicated by 13 in Figs. 3 and 5.

The invention is not limited to the embodiments shown and described which serve as examples to illustrate the principle of the invention. Thus it will in certain cases be possible to use two or more hairpin shaped laminated springs, one above the other.

I claim:

1. In an engine valve arrangement the combination of, a valve stem, a cam member for actuating said valve stem, a hairpin-shaped laminated valve spring, means pivotally supporting the closed end of said laminated spring, one of the free ends of said spring engaging said valve stem and the other free end of the spring engaging a rigid part of the engine.

2. In an engine valve arrangement the combination of a valve stem, a cam member for actuating said valve stem, a hairpin-shaped laminated valve spring, means pivotally supporting said laminated spring so as to turn about a pivot located at the closed end of the spring, said pivot being arranged adjacent one face of the valve spring and extending parallel thereto, one of the free ends of said spring engaging the valve stem and the other free end of the spring engaging a rigid part of the engine.

3. In an engine valve arrangement the combination of a valve stem, a cam member for actuating said valve stem, a hair-pin-shaped laminated valve spring, the closed end of said spring having a slot therein, a pin extending through said slot for pivotally supporting the closed end of the spring, and said slot being dimensioned to permit turning movement of the spring and displacement in a lengthwise direction of the spring due to the influence of the cam member actuating the spring through the valve stem.

4. In an engine valve arrangement the combination of a valve stem, a cam member for actuating said valve stem, a hairpin-shaped laminated valve spring, means pivotally and displaceably supporting the closed end of said laminated spring, one of the free ends of said spring engaging said valve stem, and the other free end of the spring engaging a rigid part of the engine.

TORKILD VALDEMAR HEMMINGSEN.